United States Patent [19]

Nickola

[11] Patent Number: 4,751,610
[45] Date of Patent: Jun. 14, 1988

[54] PLURAL UTILITY SUPPLY PEDESTAL INCLUDING CONTAINED COMMON GROUNDING MEANS

[76] Inventor: Anne D. Nickola, G 6261 N. Saginaw Rd., Mt. Morris, Mich. 48458

[21] Appl. No.: 869,687

[22] Filed: Jun. 2, 1986

[51] Int. Cl.[4] .............................................. H02B 1/04
[52] U.S. Cl. ..................................... 361/369; 174/38; 174/45 R; 174/51; 361/428
[58] Field of Search .................. 174/37, 38, 45 R, 51; 339/14 R, 14 L; 361/331, 334, 364, 369, 370–373, 417, 419, 420, 332, 424–428

[56] References Cited

U.S. PATENT DOCUMENTS

| Re. 31,359 | 8/1983 | Nickola | 174/45 R |
|---|---|---|---|
| D. 204,269 | 4/1966 | Naudus, Jr. | |
| 438,773 | 10/1890 | Dinn | |
| 1,481,280 | 1/1924 | Bivens | |
| 1,972,187 | 9/1934 | Farnam | 247/1 |
| 2,982,593 | 5/1961 | Chambers | 312/223 |
| 3,015,024 | 12/1961 | Charchan et al. | 240/2 |
| 3,167,609 | 1/1965 | Brann | 174/70 |
| 3,180,920 | 4/1965 | Fletcher et al. | 174/38 |
| 3,215,831 | 11/1965 | Gladsden et al. | 240/84 |
| 3,238,289 | 3/1966 | Rowe | 174/72 |
| 3,257,496 | 6/1966 | Hamilton | 174/38 |
| 3,341,268 | 9/1967 | Bickford | 312/100 |
| 3,341,744 | 9/1967 | Barwick | 174/45 R |
| 3,361,938 | 1/1968 | Watson | 317/120 |
| 3,415,942 | 12/1968 | Knoy | 174/51 |
| 3,435,124 | 3/1969 | Channell | 174/51 |
| 3,450,951 | 6/1969 | Boyle | 317/105 |

*Primary Examiner*—G. P. Tolin
*Attorney, Agent, or Firm*—Gifford, Groh, VanOphem, Sheridan, Sprinkle and Dolgorukov

[57] ABSTRACT

A mounting pedestal adapted to support an electrical meter and power box, and other utility service devices, in a compact and safe arrangement for their provision to a mobile home. A hollow, plastic post is supported in an upright position in the earth, and the power box and meter are attached to an L-shaped mounting bracket on the top of the post. The meter, power box and other devices are connected to a common ground, the common ground being at least partly embedded in the plastic post. In one preferred embodiment, the common ground includes a flat plate extending substantially throughout the length of the plastic post and is embedded therein. In a second preferred embodiment, the common ground includes a plurality of conductors extending through the plastic post, the conductors being connected by a common ground wire extending between them, which is disposed interiorly of the post. The supply wires for the utility devices extend within the plastic post from below ground level upwards to the associated devices.

16 Claims, 2 Drawing Sheets

U.S. Patent    Jun. 14, 1988    Sheet 1 of 2    4,751,610
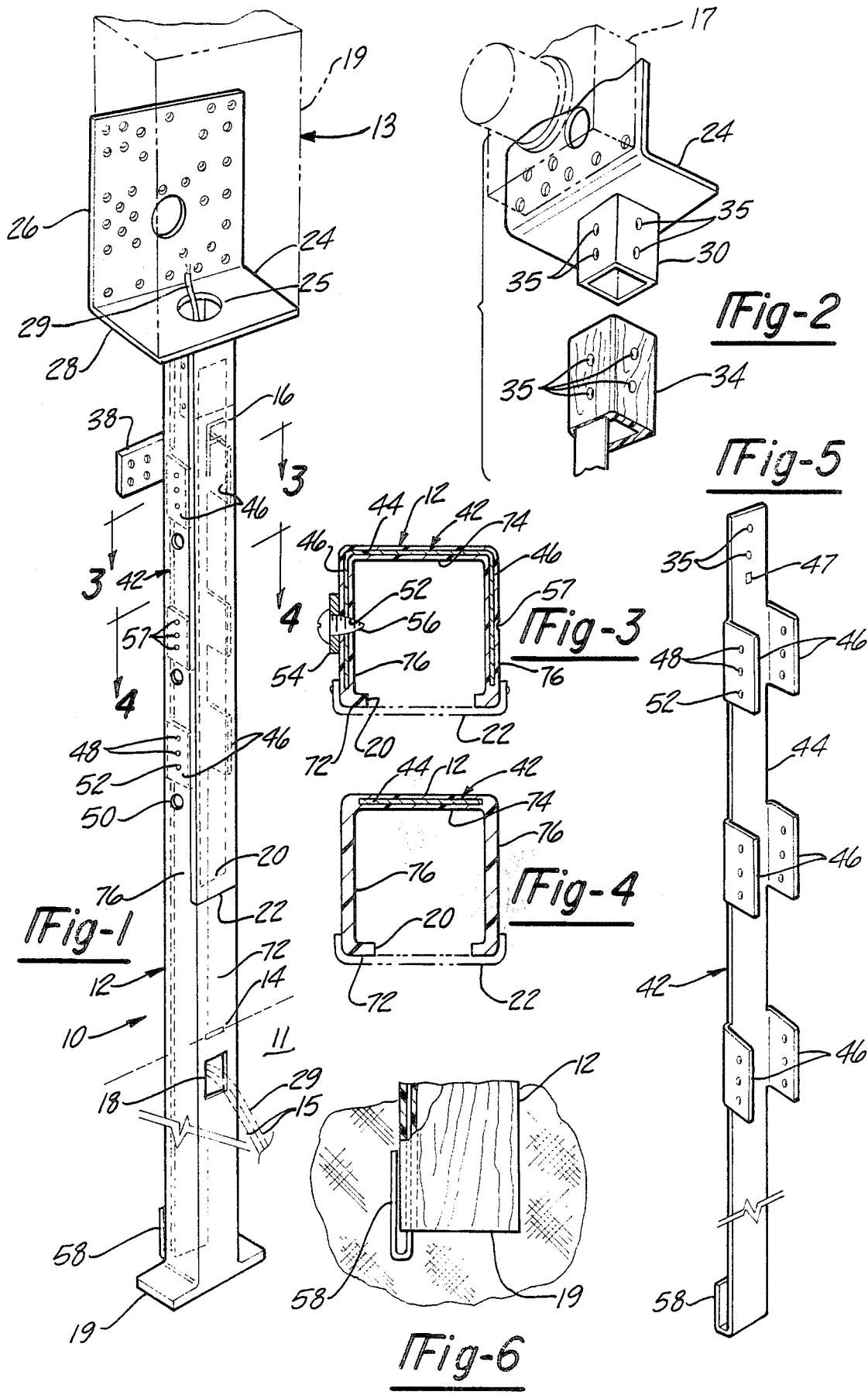

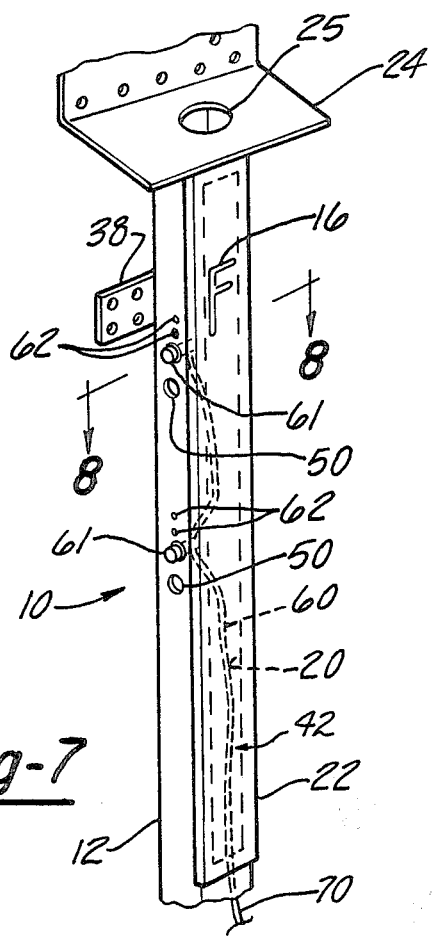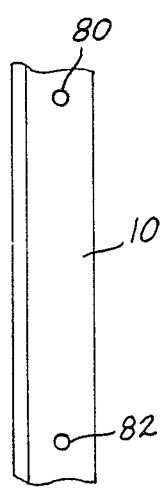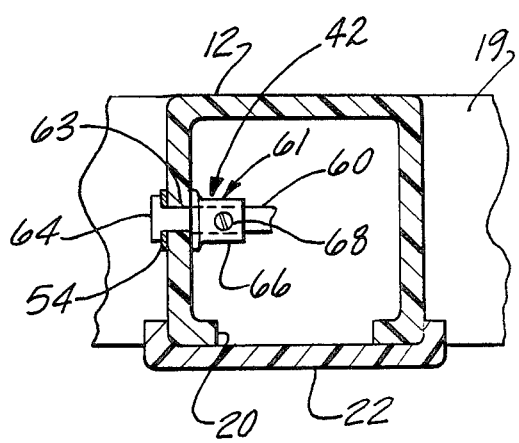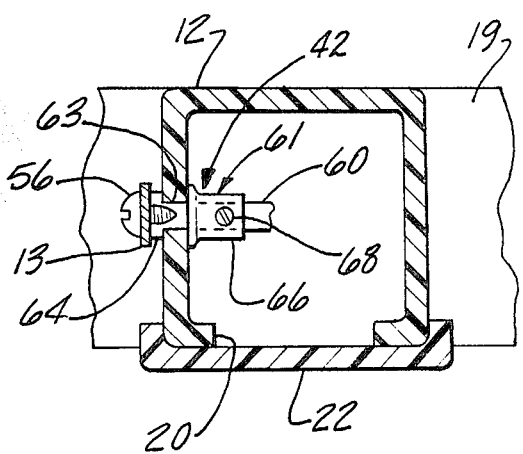

PLURAL UTILITY SUPPLY PEDESTAL INCLUDING CONTAINED COMMON GROUNDING MEANS

BACKGROUND OF THE INVENTION

I. Field of the Invention

The present invention relates to mounting pedestals for utilities, and more particularly, to a mounting pedestal for the compact and safe mounting of an electric meter, an electrical power box, a telephone junction box, a television jack, a water cyclometer and a gas meter, for conveniently furnishing such utilities to a mobile home.

II. Description of the Prior Art

Conventionally, utilities such as electrical power, telephone service, cable television service, water and gas have been provided for mobile homes through separate lines and conduits leading from meters and junction boxes. The utility meters were often supported in the vicinity of the mobile home but placed at separate locations selected by each utility company. In mobile home parks, if there were no conveniently located tree or utility pole near the mobile home, each utility company often drove a post into the ground to support their particular meter or junction box for servicing one or more nearby mobile homes. Sometimes the meters or junction boxes for a large number of mobile homes were centrally located at a single spot. This resulted in a tangle of utility wires and pipes, which was both visually displeasing and inconvenient to connect and disconnect upon removal of the mobile home from its parking site. Particularly with respect to centrally located meters, there was delay in deactuating the utility supply in case of fire, due to the remoteness of the meters.

My earlier mounting pedestal for utilities, U.S. Pat. No. Re. 31,359 (Aug. 23, 1983), solved these and other problems relating to utility pedestals. However, my prior device did not address the problems of the expense of producing a unitary, grounded utility pedestal; or of the relatively short useful life of a metal pedestal, due to rusting and the like. Merely replacing the metal post with a nonconductive post, in combination with separate ground wire, is not a practical solution to the problem. Each utility company employs its own personnel to install its device, and it is unlikely that each installer will take the time to connect each device to a ground wire attached to the other devices. In some locales, such an act may even constitute an illegal interference with, or modification of, the supply of the other utility.

SUMMARY OF THE PRESENT INVENTION

The present invention solves these and other problems by providing a low-cost and corrosion-free plastic post for mounting groundable utility devices comprising a common ground for those devices at least partly embedded in the plastic of the post, wherein connection to the ground is automatic upon the fastening of each device to the post. The plastic post is hollow and is supported in an upright position in the ground. In each of two preferred embodiments, an electric meter and an electrical power box are attached to an L-shaped mounting bracket on the top of the post, on opposite sides of an upwardly depending portion of the bracket. The telephone junction box, the television jack, the water cyclometer and the gas meter are mounted on the sides of the plastic post. The input lines for the electric meter, the electrical power box, the telephone junction box, the television jack and the service wire to the water cyclometer all enter the interior of the plastic post at its bottom, through an aperture below ground level. The inputs extend upwardly inside the post and pass through openings in the top or sides of the post for connection to their associate utility devices.

Each of the utility devices is connected to a common means for grounding the devices. The common ground is at least partly embedded in the plastic material of the post. In one preferred embodiment, the common ground includes a flat plate extending substantially through the length of the plastic post and is embedded therein. A plurality of tabs are embedded in the walls of the post perpendicular to the plate, to ensure the firm mounting of the utility device to the post and to provide an internal reinforcement of the post.

In another preferred embodiment, the common ground means includes a plurality of conductors breaching the plastic post at spaced intervals, the conductors being connected by a common ground wire extending between the conductors interiorly of the post. Preferably, the conductors each comprise a round, T-shaped stud which is slidably received in a hole in the wall of the post, the conducting stud being retained in the hole by an annular retainer. The retainer has a set screw engageable with both the stud and the common ground wire to insure a secure connection. When a particular conductor is not connected to a utility device, the stud can be removed or the common ground wire disconnected therefrom, so that an unused stud does not serve as an exposed ground that might corrode with time.

In both embodiments, the end of the common ground means opposite the utility devices is electrically connected to the earth ground. The connection of the utility devices to the post and to the common ground means is conveniently carried out by the removal of an elongated plastic cover disposed on one side of the post above ground level. The removable cover hides an elongated aperture in one wall of the post extending substantially along its length from the top of the post to a point just short of dirt level. The input line or cables to the utility devices enter the interior of the post below ground level, and run up to the level of the devices, and access to them is had through the aperture.

In the first preferred embodiment of the common ground means, the fastener (such as a bolt or screw) which attaches the utility supply device to the post penetrates through the plastic material of the post and conductively connected to the metal plate in the post. In the second preferred embodiment, the fastener engages the conductive stud in the wall of the plastic post. Thus, in both embodiments, the installer of a particular utility does not have to take special steps to make a grounding connection with another utility's supply device.

BRIEF DESCRIPTION OF THE DRAWING

A better understanding of the present invention will be had upon reference to the following detailed description, when read in conjunction with the accompanying drawing, wherein like reference characters refer to tlike parts throughout the several views, and in which:

FIG. 1 is a perspective view of the first preferred embodiment of the present invention;

FIG. 2 is a fragmentary perspective view of the first preferred embodiment of the present invention;

FIG. 3 is a cross-sectional view taken along line 3—3 in FIG. 1;

FIG. 4 is a cross-sectional view taken along line 4—4 in FIG. 1;

FIG. 5 is a perspective view of the first preferred embodiment of the present invention, with parts removed for clarity;

FIG. 6 is a side view of a portion of the preferred embodiment of the present invention.

FIG. 7 is a perspective view of a second preferred embodiment of the present invention;

FIG. 8 is a cross-sectional view taken along line 8—8 in FIG. 7;

FIG. 9 is a cross-sectional view similar to FIG. 8; and

FIG. 10 is a fragmentary elevational view as seen from the right side of FIG. 1.

DETAILED DESCRIPTION OF THE PREFERRED EMBODIMENT OF THE PRESENT INVENTION

With reference first to FIGS. 1 and 7, the pedestal 10 according to the present invention is thereshown and comprises a hollow, elongated plastic post 12 embedded in the earth 11 up to a premeasured depth mark 14 (FIG. 1) on the side of the post 12. The post 12 is adatped for the attachment of one or more groundable means 13 for supplying a utility to a mobile home (not shown) or to some other location. Indicia 16 is disposed on the front of the post 12 to permit a correspondence of the post 12 with the loction to which the utilities are supplied by the utility supply means 13. The utility supply means 13 are of a type conventionally known, and at least one of them is groundable.

The lower portion of the post 12 preferably includes a foot 19 (FIG. 1) at the bottom end of the post 12, which assists in retaining the post 12 in the ground and preventing its removal. This is especially important in areas which experience frost. A lower aperture 18 is formed in the post 12 between the foot 19 and the ground level mark 14. The aperture 18 permits the passage of inputs 15 corresponding to each of the electromechanical utility supply means 13 into the hollow interior of the post 12 and upward to the utility supply means 13. A nylon grommet (not shown) can be inserted into the lower aperture 18, once the inputs 15 have been fed therethrough, so as to prevent the intrusion of dirt or debris into the interior of the post 12.

An elongated upper aperture 20 is formed in the side of the post 12 above the ground level mark 14. The upper aperture 20 extends substantially to the top of the post 12. A cover 22 is provided to fit over the upper aperture 20 during use of the pedestal 10, but whose removal allows access to the interior of the hollow post 12 during installation, service or removal of the utility supply means 13.

A bracket 24 is attached to the top of the post 12. The bracket has a central opening 25 in alignment with the hollow interior of the post 12. The bracket 24 comprises an upstanding portion 26 and a base portion 28. This construction for the bracket 24 is particularly convenient when the utilities supply means 13 comprises at least an electric meter 17 (FIG. 2) and an electrical power box 19 (FIG. 1). The meter 17 and power box 19 are disposed on opposite sides of the upstanding portion 26 of the bracket 24. Conveniently, one of the utility inputs 15 comprises a powerline 29 extending upward inside the post 12 through the opening 25 and to the electric meter 17.

The bracket 24 comprises a male portion 30 on the bottom thereof, having a square cross section. A correspondingly shaped female portion 34 is formed in the upper end of the post 12 to receive the male portion 30 therein. Holes 35 for fasteners (not shown) are provided for the attachment of the bracket 24 to the post 12.

Similarly, a plate 38 is fastened to the side of the post 12 by means such as fasteners for the mounting of another utility supply means 13 to the post, for example, a telephone junction box (not shown).

Referring to FIG. 1, this pedestal 10 according to the present invention also comprises a common grounding means 42 for grounding each of the groundable utility supply means 13 carried on the post 12. The common grounding means 42 is at least partly embedded in the plastic material of the post 12 so that sparing or arcing between an ungrounded object and the post 12 is avoided. Each of the utility supply means 13 is grounded by connection to the common ground means 42.

The common ground means 42 can be either substantially completely embedded in the plastic post 12, as can best be seen in FIGS. 1 through 6; or only partly embedded in the plastic post 12, as can best be seen in FIGS. 7 through 9.

With particular reference to the former embodiment, the ground means 42 first comprises a substantially flat and elongated metal plate 44 disposed in the plastic material of the post 12 and extending substantially from its top to its foot 19. A plurality of flat tabs 46 extend perpendicularly from the plate 44 and are similarly embedded in the plastic material of the post 12. Most conveniently, the tabs 46 are placed at locations above the level of the earth so that the installer can have access to their locations through the upper aperture 20 of the post 12. Preferably, when the upper aperture 20 is disposed on a front wall 72 of the post 12, the plate 44 is embedded in the rear wall 74 of the post 12, and the tabs 46 are embedded in the side walls 76 of the post 12 (FIGS. 3 and 4). A lug 47 is provided on the plate 44 to ensure the correct locating of the plate 44 and the tabs 46 in the post 12, when they are embedded in the post 12, for example, as by casting.

Each of the tabs 46 is provided with a plurality of holes, preferably four holes, for the supply, attachment and grounding of each of the utility supply means 13. The holes 48 are provided for the affixment of the utility supply means 13 to the post 12. A conductive fastener 56 is inserted into the hole 48 for two purposes. First, the fastener 56 serves to attach the utility supply means 13 to the post 12. Secondly, by breaching the plastic material of the post 12, the conductive fastener 56 makes electrical contact with the common grounding means 42, and thereby serves to ground the utility supply means 13 through a grounding portion 54 thereof. A third hole can comprise a separate grounding hole 52 for the connection of an optional ground strap from the utility supply means 13 and to the common grounding means 42. Another conductive fastener 56 penetrates the plastic material of the post 12 and connects the ground strap 54 to the common grounding means 42. A fourth and usually somewhat larger hole 50 is provided, in either the tab 46 and the post 12 (not shown), or only in an adjacent portion of the post 12, in order to permit the passage therethrough of the appropriate input 15 from the interior of the hollow post 12 to the utility supply means 13. A plurality of dimples 57 are provided on the outer surface of the post 12 in order to permit the installer to easily locate the positions of the tabs 46 and the associated holes 48 and 52. In this embodiment, the common ground means 42 is not exposed to the exterior of the post 12, except when the material of the post is penetrated by the conductive fasteners 56. Although not shown, conductive fasteners 56 will also attach the bracket 24 to the plate 44 through the holes 35. Unused holes can be sealed by nylon grommets (not shown) to seal the post and prevent exposure of the ground means 42. As can best be seen in FIG. 10, holes 80 and 82 are provided to provide the means for attaching a gas meter or the like (not shown) to the post 10.

The common grounding means 42 is grounded to earth at its end opposite the top of the post 12. Although this connection can occur by any conventional means, prefereably the plate 44 comprises a U-shaped end 58 wrapped about the lower end of the post 12 adjacent the foot 19. The length and lateral width of the end 58 should be selected so as to be sufficient to ensure grounding of the common ground means 42 to the earth.

Of course, in order to isolate the common grounding means 42, it need not be totally embedded in the plastic material of the post 12, but can be only partially embedded, as can be seen in the embodiment shown in FIGS. 7 through 9. In this latter embodiment, the common grounding means 42 comprises a common ground wire 60 disposed within the hollow post 12 connected to a plurality of conductors 61 which are embedded in but breach the material of the post 12. Preferably, the conductors 61 are disposed in round holes 63 in the post 12. In this embodiment, the post 12 also includes at least two mounting holes 62 for mounting the utility supply means 13 to the post 12, and usually somewhat larger input hole 50 for the passage therethrough of the input 15 to the utility supply means 13 in the manner described earlier.

The connector 61 first comprises a conductive stud 64 which is affixed in the round hole 63 by an annular retainer 66 attached thereto, which is disposed inside the hollow post 12. A set screw 68 in the annular retainer 66 fastens the stud 64 to the retainer 66, and also affixes the common ground wire 60 to the conductive stud 64. Alternatively, the stud 64 and the retainer 66 can comprise a unitary piece embedded in the material of the post 12.

Similarly to the first embodiment, the utility supply means 13 is attached to the post 12 by a conductive fastener 56 which conductively engages the common ground means 42. Preferably, this occurs by the threaded engagment of the fastener 56 in a hole 67 in the stud 64 (FIG. 8). Optionally, grounding can occur by the entrapment of the separate ground strap 54 between the stud 64 and the post 12 (FIG. 9).

As is the first embodiment, each of the sets of the two mounting holes 62, the input holes 50 and the ground holes 63 are disposed so that access thereto may be had through the elongated upper aperture 20 in the post 12. The common ground means 42 is grounded by attachment of the ground wire 60 to an earth ground in any conventional fashion, for example, by the attachment of a nether end 70 of the ground wire 60 to a water supply pipe or other means not shown. When a particular stud 64 is not to be used as a grounding means, the stud 64 can be easily removed from the post, and the mount holes 62, the input hole 50 and the ground hole 63 can be filled with a nylon grommet (not shown) in order to seal the pipe 12 and prevent contact with the grounding means 42.

The pedestal according to the present invention thus provides a structurally strong, easily assembled and well grounded assembly particularly convenient for use with mobile homes. The service lines for the various utilities extend underground into the post 12 through the lower aperture 18, and are thus protected against damage by moving vehicles or mobile homes being installed or removed. The elongated upper aperture 20 aids the secure fastening of the utility supply means 13 to the post, as a nut or retainer (not shown) can engage the fastener 56 interiorly of the post 12. Most importantly, the use of plastic for the post material avoids the cost and susceptibility to corrosion of a metal post, while insuring grounding of the utility devices, without requiring undue effort on the part of each utility employee.

Having described my invention, however, many modifications thereto will become apparent to those skilled in the art to which it pertains, without deviation from the spirit of the present invention as defined by the scope of the apended claims.

I claim:

1. An elongated plastic post having a L-shaped bracket disposed at the top thereof, said post being hollow to form an elongated interior portion, at least two groundable utility supply means carried on said post and common means electrically grounding each said utility supply means wherein said grounding means comprises an electrically conductive member mounted in said plastic post and having spaced connectors embedded in the material of the post, and electrically conducting means disposed within said interior portion electrically connecting each of said utility supply means to said electrically conductive member.

2. The invention according to claim 1, wherein the input for said utility supply means passes through said post.

3. The invention according to claim 1, further comprising an elongated aperture in said post for access to the interior of said post.

4. The invention according to claim 1, wherein said post is mounted in the earth.

5. The invention according to claim 4, further comprising an aperture below ground level for the passage of an input for said utility supply means into said plastic post.

6. The invention according to claim 1, wherein said post is mounted in an upright position.

7. The invention according to claim 6, further comprising an L-shaped bracket mounted atop said post adapted for the affixment of an electrical meter and an electrical power box thereto.

8. The invention according to claim 1, wherein common grounding means comprising a plate and plurality of tabs extending perpendicularly from said plate are embedded in the plastic of said post.

9. The invention according to claim 1, wherein said conductors are removable from said post.

10. The invention according to claim 1, wherein each of said conductors comprise a stud retained on said post by a retaining member disposed inside and said post.

11. The invention according to claim 10, wherein said condcutor comprises a fastener.

12. The invention according to claim 1, wherein said utility supply means comprises an electrical meter and an electrical power box mounted on said post.

13. The invention according to claim 1, wherein said utility supply means comprises a telephone junction box mounted on said post.

14. The invention according to claim 1, wherein said utility supply means comprises a television jack mounted on said post.

15. The invention according to claim 1, wherein said utility supply means comprises a water cyclometer mounted on said post.

16. The invention according to claim 1, additionally comprising a gas meter mounted on said post.

* * * * *